(12) United States Patent
Wu et al.

(10) Patent No.: US 8,325,470 B2
(45) Date of Patent: Dec. 4, 2012

(54) ELECTRONIC DEVICE WITH SLIDABLE KEYBOARD

(75) Inventors: Wei Wu, Shenzhen (CN); Xin Yang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 254 days.

(21) Appl. No.: 12/871,828

(22) Filed: Aug. 30, 2010

(65) Prior Publication Data

US 2011/0102995 A1 May 5, 2011

(30) Foreign Application Priority Data

Nov. 2, 2009 (CN) .......................... 2009 1 0309222

(51) Int. Cl.
*G06F 1/16* (2006.01)

(52) U.S. Cl. ..................................... 361/679.14; 341/22

(58) Field of Classification Search ............. 361/679.11, 361/679.14; 341/22
See application file for complete search history.

(56) References Cited

U.S. PATENT DOCUMENTS

| 5,388,921 | A | * | 2/1995 | Chung .......................... 400/472 |
|---|---|---|---|---|
| 5,483,418 | A | * | 1/1996 | Hosoi ....................... 361/679.55 |
| 5,543,787 | A | * | 8/1996 | Karidis et al. ................... 341/20 |
| 5,588,759 | A | * | 12/1996 | Cloud ............................ 400/472 |
| 5,596,480 | A | * | 1/1997 | Manser et al. ........... 361/679.14 |
| 5,615,081 | A | * | 3/1997 | Ma ............................ 361/679.14 |
| 5,646,817 | A | * | 7/1997 | Manser et al. ........... 361/679.14 |
| 5,659,307 | A | * | 8/1997 | Karidis et al. ................... 341/22 |
| 5,708,562 | A | * | 1/1998 | Agata et al. .............. 361/679.11 |
| 5,734,548 | A | * | 3/1998 | Park ........................ 361/679.14 |
| 5,786,775 | A | * | 7/1998 | Chang ............................ 341/22 |
| 5,838,263 | A | * | 11/1998 | Chang ............................ 341/22 |
| 6,055,153 | A | * | 4/2000 | Chiu et al. ................ 361/679.14 |
| 6,798,649 | B1 | * | 9/2004 | Olodort et al. ........... 361/679.13 |
| 2005/0002158 | A1 | * | 1/2005 | Olodort et al. ................ 361/683 |

* cited by examiner

*Primary Examiner* — Lisa Lea Edmonds
(74) *Attorney, Agent, or Firm* — Altis Law Group, Inc.

(57) ABSTRACT

An electronic device includes a lid and a main body rotatably connected to each other. The main body includes a lower housing, an upper housing, a keyboard, a cover disposed on the upper housing, and a driving member. The keyboard is disposed on the upper housing and includes a first keyboard and a second keyboard coupled to each other. The driving mechanism is used to drive the first keyboard and the second keyboard to switch between a fist position and a second position. In the first state, a portion of the first keyboard is shielded by the cover, and in the second state, the first keyboard and the second keyboard are totally exposed.

8 Claims, 8 Drawing Sheets

ELECTRONIC DEVICE WITH SLIDABLE KEYBOARD

BACKGROUND

1. Technical Field

The present disclosure relates to an electronic device with a slidable keyboard.

2. Description of the Related Art

Generally, electronic devices, such as a notebook computer, include a main body and a keyboard disposed on the main body. With the trend towards the miniaturization of electronic devices, the area of keyboard is limited by the size of the main body and may hinder the miniaturization process.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
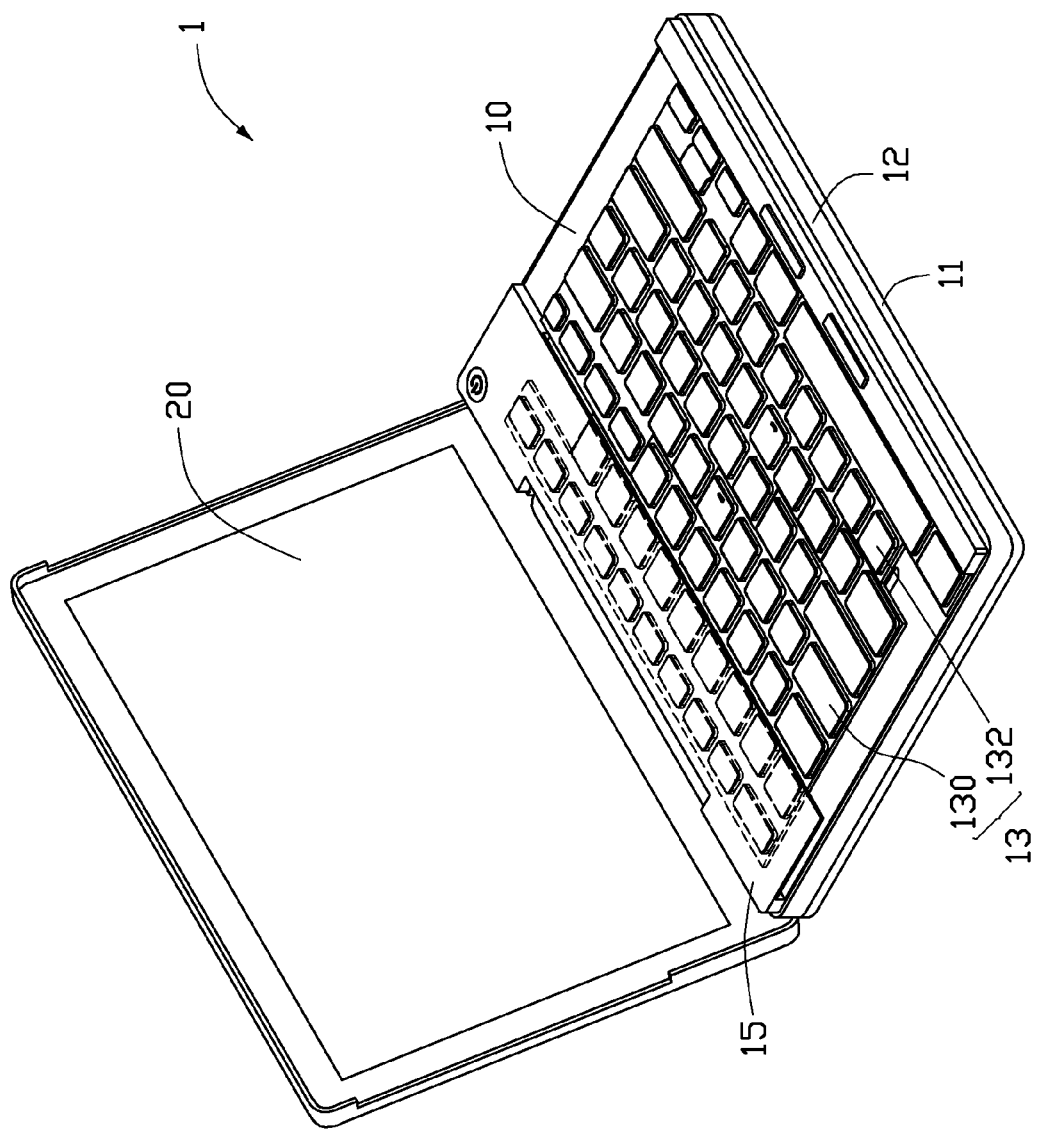
FIG. 1 is an isometric view of an electronic device according to an exemplary embodiment, showing a main body in a first state.
Figure 2:
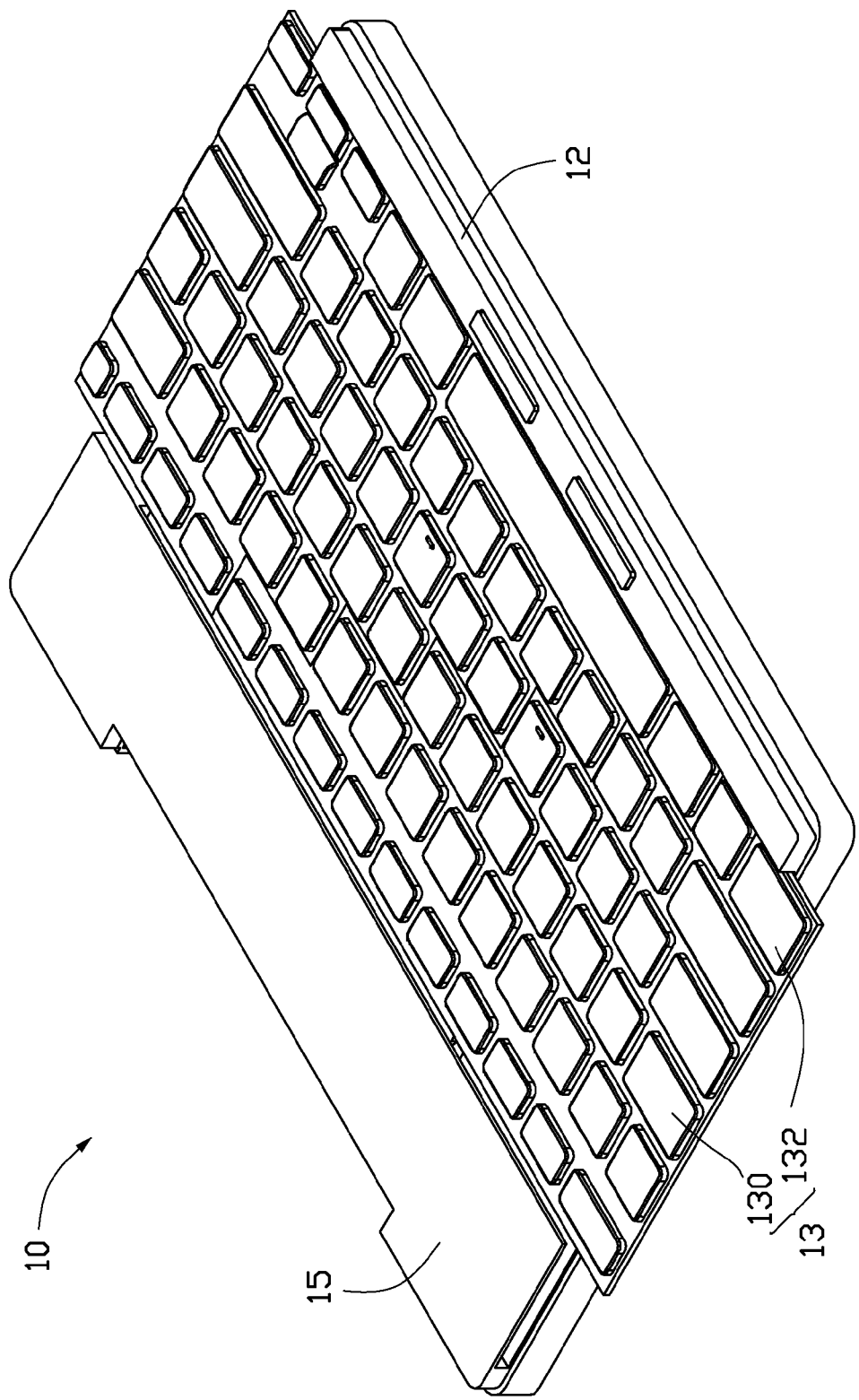
FIG. 2 is an isometric view of the main body of the electronic device of FIG. 1 in a second state.

Referring to FIGS. 1-2, an electronic device 1 according to an exemplary embodiment is disclosed. The electronic device 1 includes a main body 10 and a lid 20 rotatably connected to the main body 10. The main body 10 includes a lower housing 11, an upper housing 12, a keyboard 13, a driving mechanism 14 (see FIG. 4), and a cover 15. The keyboard 13 and the cover 15 are both disposed on the upper housing 12. The driving mechanism 14 is received between the lower housing 11 and the upper housing 12.

FIG. 1 shows the main body 10 in a first state that part of the first keyboard 130 is shielded by the cover 15. FIG. 2 shows the main body 10 in a second state that the first keyboard 130 and the second keyboard 132 is moved to be totally exposed as driven by the driving mechanism 14.

Figure 3:
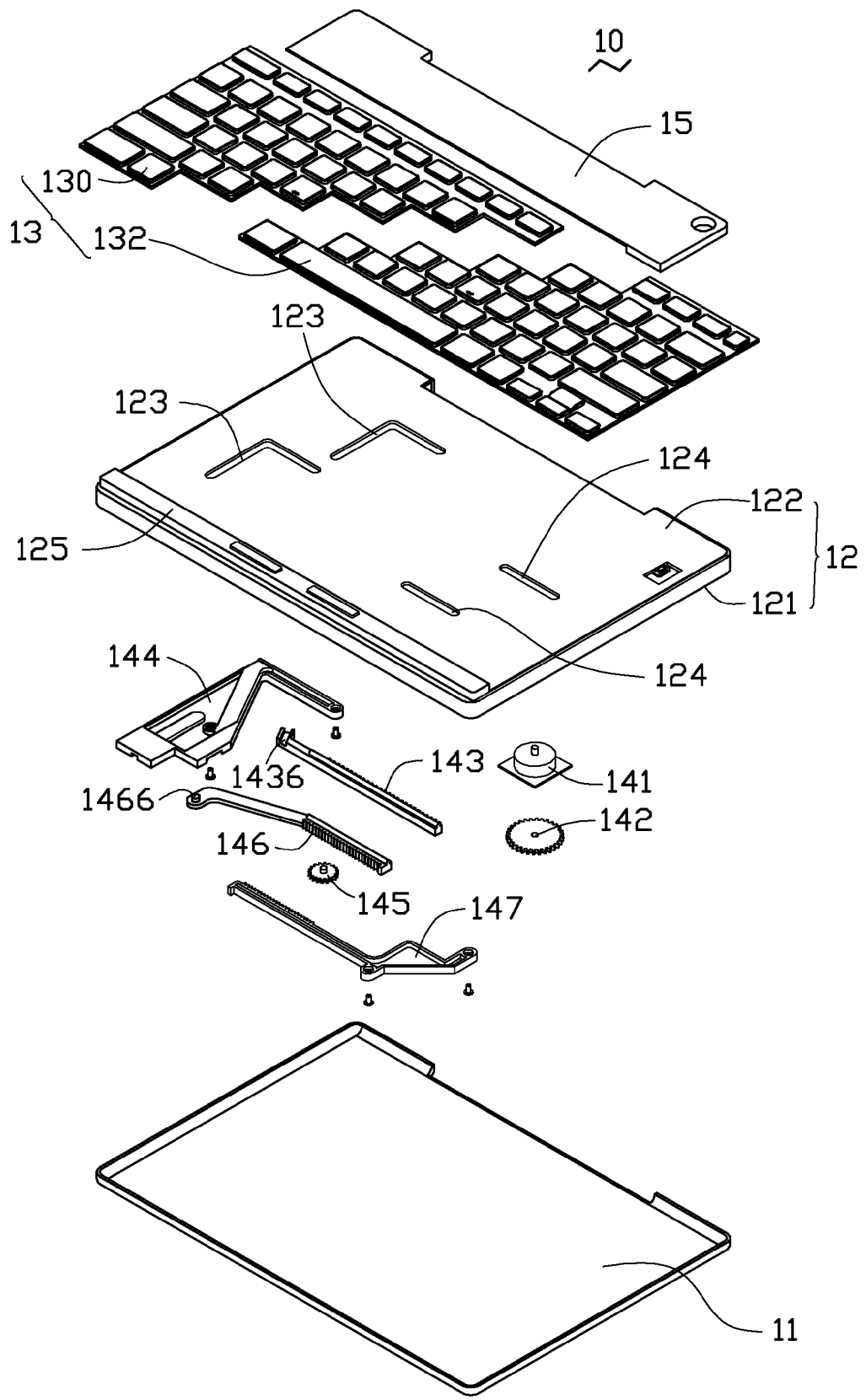
FIG. 3 is an exploded view of the main body of the electronic device of FIG. 1.
Figure 4:
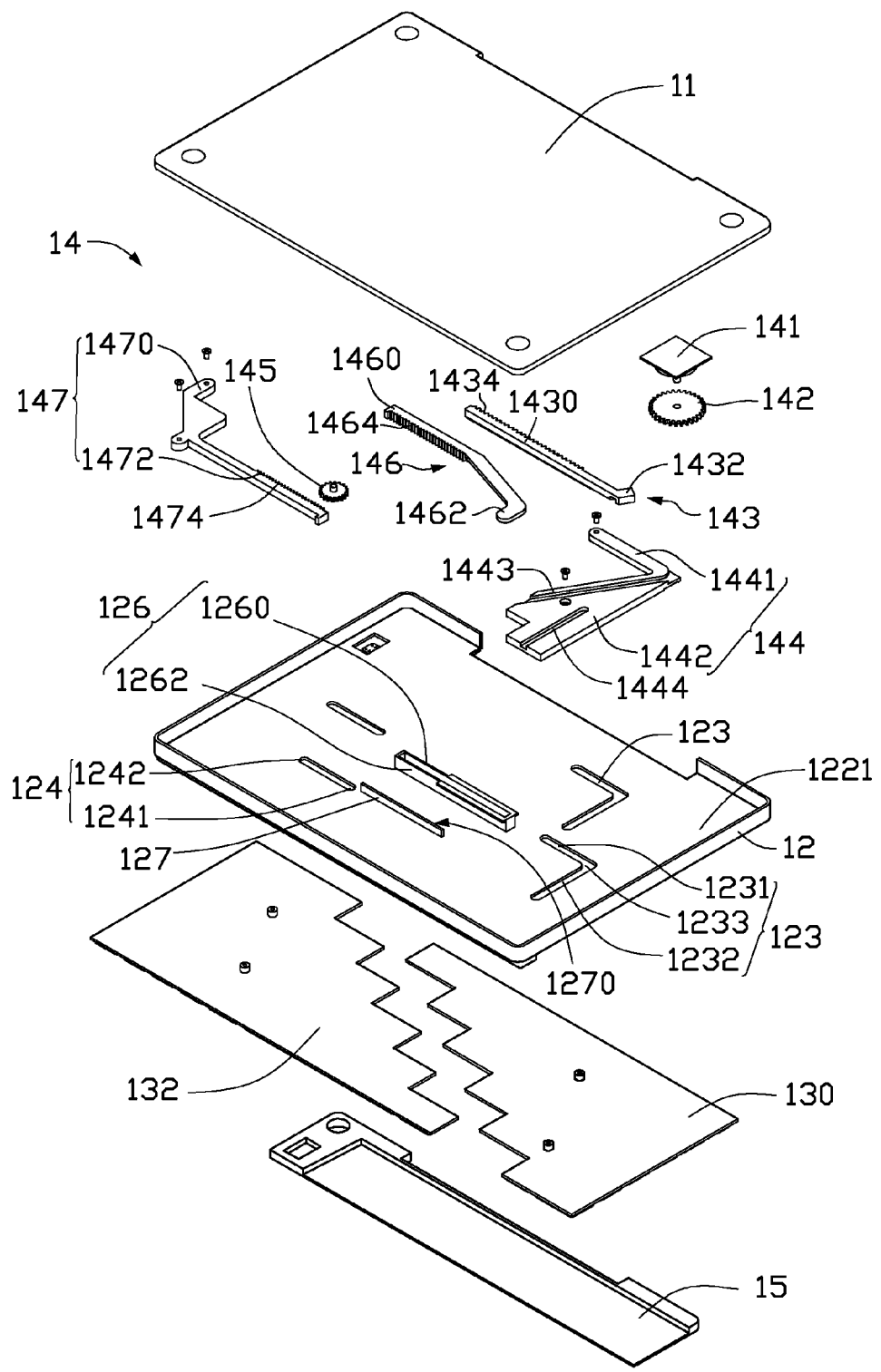
FIG. 4 is similar to FIG. 3, but viewed from a reversed perspective.

Referring to FIGS. 3-4, the lower housing 11 and the upper housing 12 are both rectangular and coupled to each other. Electronic components, e.g., a central processing unit (CPU), a printed circuit board (PCB), and a fan, can be received between the lower housing 11 and the upper housing 12. The upper housing 12 includes a bottom surface 121 and an opposite top surface 122. The upper housing 12 defines two first slots 123 and two second slots 124 spanning through from the bottom surface 121 to the top surface 122. Each first slot 123 is L shaped and includes a first end 1231, a second end 1232, and a transition 1233 between the first end 1231 and the second end 1232. Each second slot 124 is substantially straight and includes a third end 1241 and a fourth end 1242. The upper housing 12 includes a bar 125 on an edge of the top surface 122 to prevent the keyboard 13 from disengaging from the main body, and a guide block 126 and a guide plate 127 on the bottom surface 121. The guide block 126 and the guide plate 127 both extend parallel to the second slots 124. The guide block 126 includes a first guide edge 1260 and an opposite guide edge 1262. The guide plate 127 includes a third guide edge 1270 facing toward the second guide edge 1262.

The keyboard 13 includes a first keyboard 130 and a second keyboard 132 coupled to each other. In the embodiment, the edges of the first keyboard and the second keyboard to connect each other are both step shaped.

Figure 5:
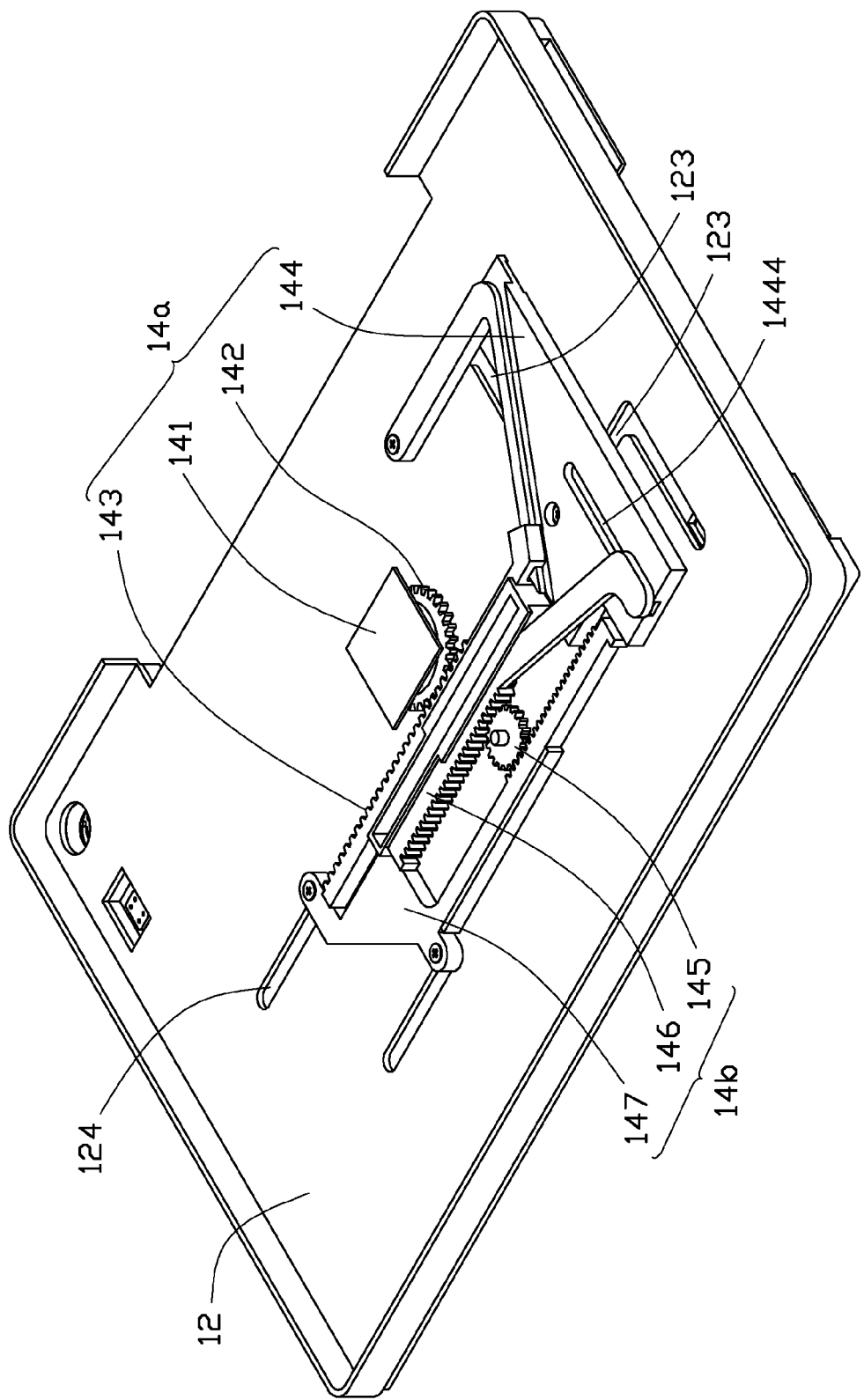
FIG. 5 is a schematic view of the main body of the electronic device of FIG. 1 in a first state.

Referring also to FIG. 5, the driving mechanism 14 includes a first mechanism 14*a* and a second mechanism 14*b*. The first mechanism 14*a* is connected to the first keyboard 130 through the first slots 123, and the second mechanism 14*b* is connected to the second keyboard 132 through the second slots 124.

The first mechanism 14*a* includes a motor 141, a first gear 142, a first driving member 143, and a first slider 144. The motor 141 is disposed on the bottom surface 121 of the upper housing 12. The first gear 142 is connected to a motor shaft (not shown) of the motor 141 and can rotate together with the motor shaft.

The first driving member 143 is elongated shaped and includes a first end 1430 and an opposite second end 1432. One side of the first end 1430 also includes a first rack 1434 for engaging the first gear 142, which converts the rotation of the first gear 142 into sliding movement of the first driving member 143. The opposite side stays in contact with the first guide edge 1260 of the upper housing 12, such that the first driving member 143 can slide along the first guide edge 1260. The second end 1432 defines a first guide slot 1436.

The first slider 144 includes a first portion 1441 and a second portion 1442 connected to each other. The second portion 1442 includes a guide bar 1443 and defines a second guide slot 1444. The guide bar 1443 slopes to the first portion 1441. The guide bar 1443 is slidably connected to the first guide slot 1436 of the first driving member 143. The second guide slot 1444 extends substantially perpendicular to the first portion 1441. The first slider 144 is fastened to the first keyboard 130 by screws (not labeled) passing through the first slots 123. The first slider 144 and the first keyboard 130 can slide together along the first slots 123.

The second mechanism 14*b* includes a second gear 145, a second driving member 146, and a second slider 147. The second gear 145 engages the second driving member 146 and the second slider 147 to transmit the sliding movement from the first slider 144 to the second slider 147.

The second driving member 146 is elongated shaped and includes a third end 1460 and an opposite fourth end 1462. One side of the third end 1460 includes a second rack 1464, which engages the second gear 145, and an opposite side stays in contact with the second guide edge 1262 of the guide block 126, such that the second driving member 146 can slide along the second guide edge 1262. The second end 1462 includes a protrusion 1466 slidably received in the second guide slot 1444 of the first slider 144.

The second slider 147 includes a third portion 1470 and a fourth portion 1472 connected to each other. The third portion 1470 is fastened to the second keyboard 132 by screws (not labeled) passing through the second slots 124. One side of the fourth portion 1472 includes a third rack 1474, and an opposite side stays in contact with the third guide edge 1270 of the guide plate 127, such that the second slider 147 can slide along the third guide edge 1270.

Referring again to FIGS. 1 and 5, the first slider 144 is fastened to the first keyboard 130 by screws passing though the first end 1231 of the first slot 123, and the second keyboard 132 is fastened to the second slider 147 by screws passing though the third end 1241 of the second slot 124. As shown in FIG. 1, in the first state, part of the keyboard 13 is shielded by the cover 15.

Figure 6:
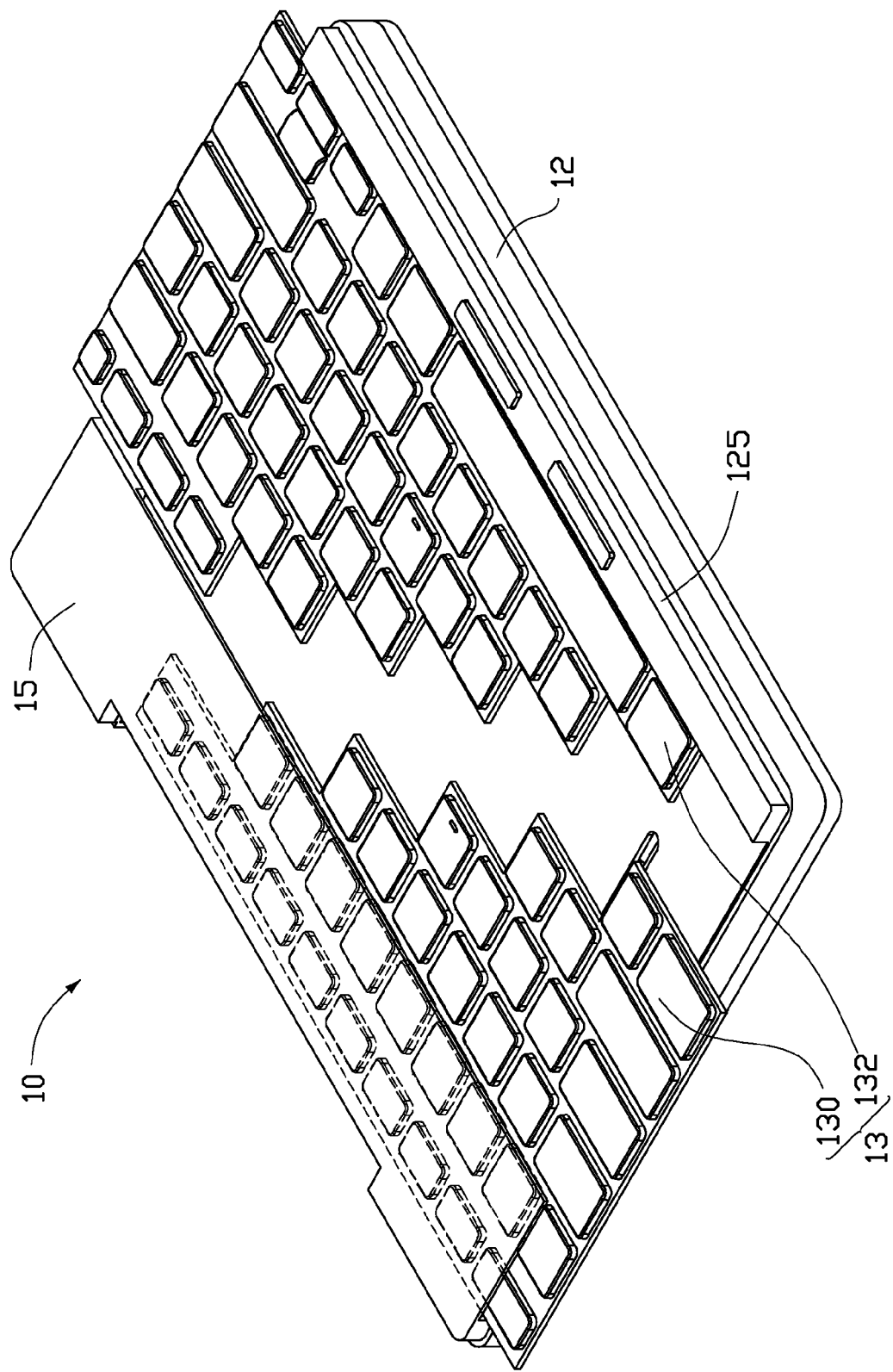
FIG. 6 is an isometric view of the main body in a state between the first state and the second state.
Figure 7:
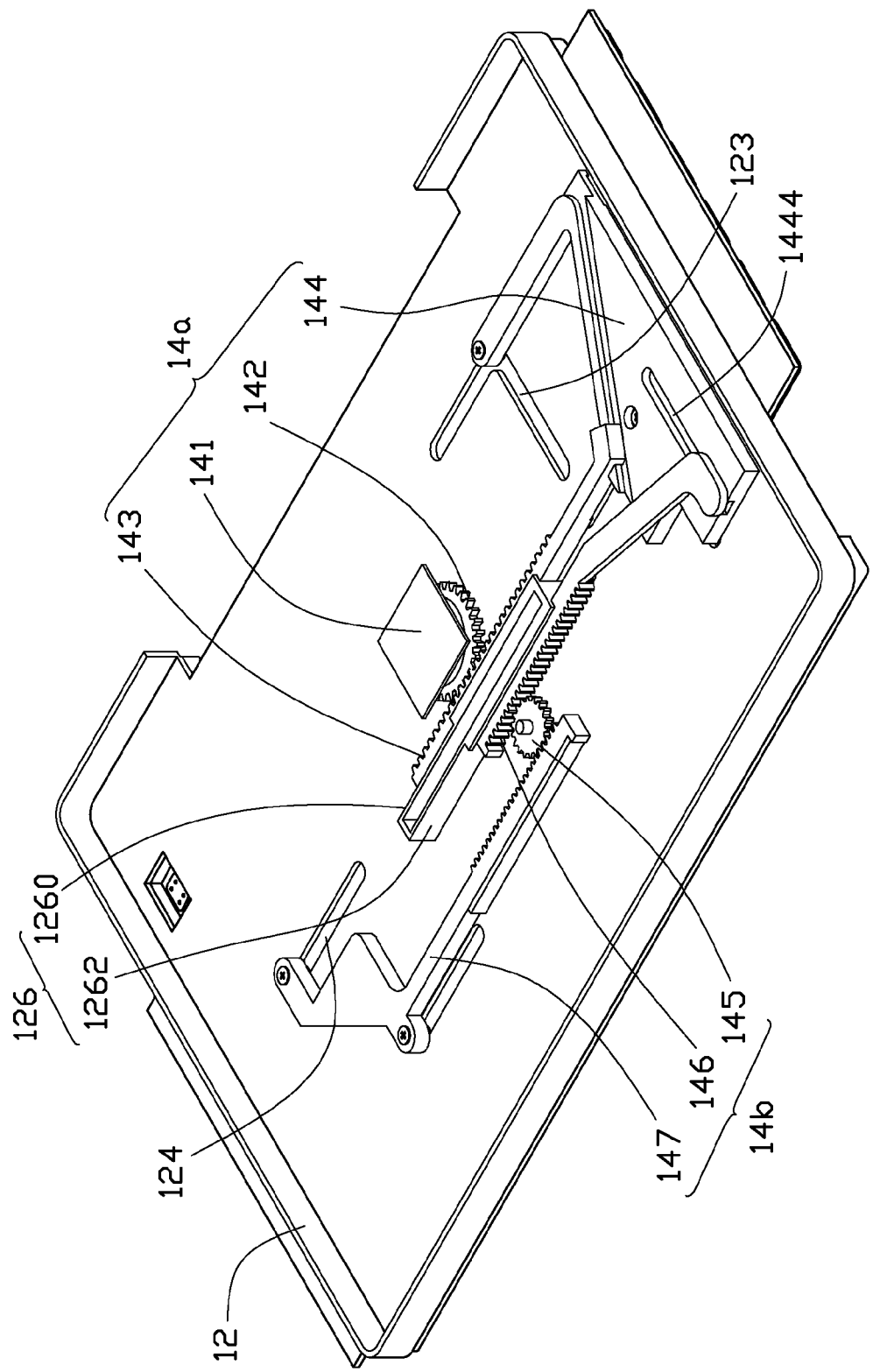
FIG. 7 is a schematic view of the main body of the electronic device of FIG. 6.

Referring also to FIGS. 6 and 7, when the motor 141 rotates the first gear 142, the first slider 143 slides along the first guide edge 1260 of the guide block 126. First, the first slider 144 will slide from the first end 1231 to the transition 1233 of the first slot 123 and the second slider 147 slides from the third end 1241 to the fourth end 1242 of the second slot 124, as driven by the second driving member 146. Secondly, the first guide slot 1436 of the first driving member 143 slides along the guide bar 1443 of the first slider 144 causing the first slider 144 to slide from the transition 1233 to the second end 1232 of the first slot 123. Thus, the main body 10 is switched to the second state.

Figure 8:
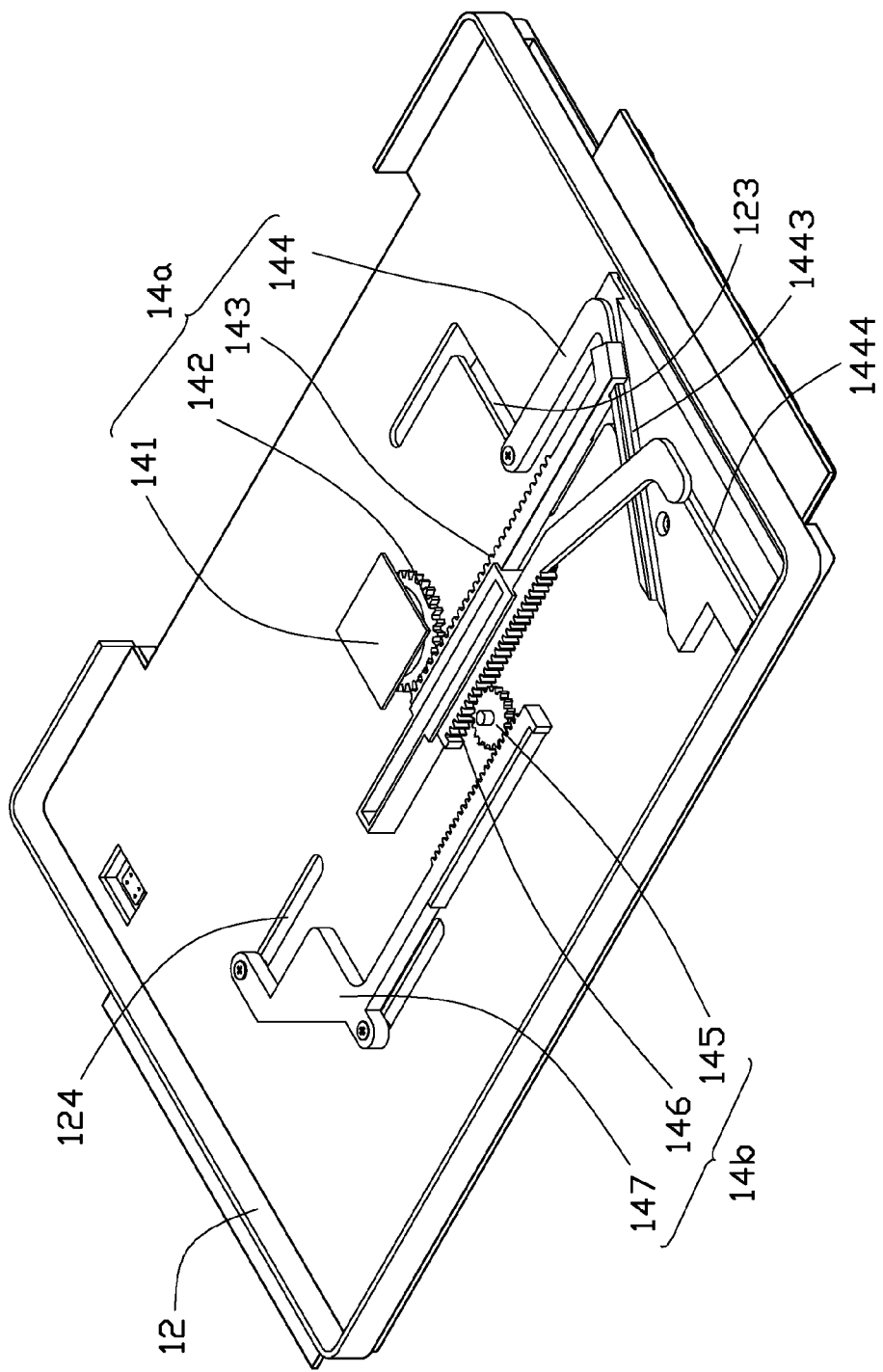
FIG. 8 is a schematic view of the main body of the electronic device of FIG. 1 in a second state.

Referring to FIGS. 2 and 8, in the second state, the first slider 144 is fastened to the first keyboard 130 by screws passing though the second end 1232 of the first slot 123, and the second keyboard 132 is fastened to the second slider 147 by screws passing though the fourth end 1242 of the second slot 124. As shown in FIG. 2, in the second state, the keyboard 13 is totally exposed.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. An electronic device comprising:
    a lid; and
    a main body rotatable connected with the lid, comprising:
        a lower housing;
        an upper housing;
        a keyboard comprising a first keyboard and a second keyboard disposed on the upper housing;
        a bar disposed along one edge of the upper housing to prevent the keyboard from disengaging from the main body;
        a cover disposed on the upper housing; and
        a driving mechanism to drive the first keyboard and the second keyboard to move between a first state and a second state;
    wherein in the first state, a portion of the first keyboard is shielded by the cover, in the second state, the first keyboard and the second keyboard are totally exposed.

2. An electronic device comprising:
    a lid; and
    a main body rotatable connected with the lid, comprising:
        a lower housing;
        an upper housing defining two first slots and two second slots;
        a keyboard comprising a first keyboard and a second keyboard disposed on the upper housing;
        a cover disposed on the upper housing; and
        a driving mechanism to drive the first keyboard and the second keyboard to move between a first state and a second state, wherein the driving mechanism comprises a first mechanism connected with the first keyboard by screws passing through the first slots and a second driving mechanism connected with the second keyboard by screws passing through the second slots;
    wherein in the first state, a portion of the first keyboard is shielded by the cover, in the second state, the first keyboard and the second keyboard are totally exposed.

3. The electronic device as described in claim 2, wherein each first slot is L shaped and comprises a first end, a second end, and a transition between the first end and the second end, and each second slot is straight and comprises a third end and a fourth end.

4. The electronic device as described in claim 3, wherein the first mechanism comprises a motor, a first gear connected to a motor shaft of the motor, a first driving member, and a first slider, the first driving member comprises a first end defining a first rack engaging with the first gear and a second end defining a first guide slot, the first slider defines a guide bar and a second guide slot, the first guide slot of the first driving member is slidably connected to the guide bar of the first slider.

5. The electronic device as described in claim 4, wherein the first slider comprises a first portion and a second portion connected to each other, the second portion includes a guide bar and defines a guide slot, the guide bar slopes to the first portion, and the second guide slot extends substantially perpendicular to the first portion.

6. The electronic device as described in claim 5, wherein the second driving mechanism comprises a second gear, a second driving member, and a second slider fastened to the second keyboard, the second driving member comprises a third end defining a second rack and a fourth end forming a protrusion slidably received within the second guide slot of the first slider, the second slider defines a third rack, and the second gear engages the second rack and the third rack.

7. The electronic device as described in claim 6, wherein when the motor rotates the first gear, the first slider slides from the first end to the second end of the first slot as driven by the first mechanism, the second slider slides from the third end to the fourth end of the second slot as driven by the second driving member, the main body is switched from the first state to the second state.

8. The electronic device as described in claim 7, wherein:
    when the motor firstly rotates the first gear, the first driving member drives the first slider to slide from the first end to the transition of the first slot, and the second driving member drives the second slider slide from the third end to the fourth end of the second slot;
    when the motor secondly rotates the first gear, the first driving member slides along the guide bar of the first slider causing the first slider to slide from the transition to the second end of the first slot.

* * * * *